US005636178A

United States Patent [19]

Ritter

[11] Patent Number: 5,636,178

[45] Date of Patent: Jun. 3, 1997

[54] FLUID DRIVEN SIREN PRESSURE PULSE GENERATOR FOR MWD AND FLOW MEASUREMENT SYSTEMS

[75] Inventor: Thomas E. Ritter, Katy, Tex.

[73] Assignee: Halliburton Company, Houston, Tex.

[21] Appl. No.: 495,328

[22] Filed: Jun. 27, 1995

[51] Int. Cl.[6] .............................. G01V 1/40; H04B 13/00

[52] U.S. Cl. ............................ 367/83; 367/84; 415/55.2; 73/861.79

[58] Field of Search ....................... 367/83, 84; 415/55.2, 415/55.3; 475/49, 59; 73/861.79, 861.87

[56] References Cited

U.S. PATENT DOCUMENTS

| | | | |
|---|---|---|---|
| 4,198,706 | 4/1980 | Elliott | 367/148 |
| 4,785,300 | 11/1988 | Chin et al. | 340/861 |
| 4,847,815 | 7/1989 | Malone | 367/84 |
| 4,914,637 | 4/1990 | Goodsman | 367/83 |
| 4,956,823 | 9/1990 | Russell et al. | 367/84 |
| 5,357,483 | 10/1994 | Innes | 367/84 |
| 5,375,098 | 12/1994 | Malone et al. | 367/83 |
| 5,517,464 | 5/1996 | Lerner et al. | 367/84 |

OTHER PUBLICATIONS

Attang et al, SPE/IAPC Drilling Conf., Feb. 23, 1993, pp. 149–159; abst. only herewith.

*Primary Examiner*—Nelson Moskowitz
*Attorney, Agent, or Firm*—Conley, Rose & Tayon, P.C.; Shawn Hunter

[57] ABSTRACT

A fluid-powered siren of the type used for communicating information between points of a wellbore. In one aspect, responsiveness of the siren's rotor to low flow rates is improved through application of greater torque to the siren rotor. Also, improved capturing and channeling action by the turbine rotor fins causes fluid flow to drive the turbine rotor and siren rotor combination more efficiently than it can drive a siren rotor directly as may be the case in other fluid-powered sirens. In another aspect, the system provides for control of the rotational speed of the siren rotor in instances wherein the fluid flow rate is too high. Control is affected by use of an epicyclical gear reducer which is positioned between the turbine rotor and the siren rotor to operably interconnect the two components.

7 Claims, 7 Drawing Sheets

FLUID DRIVEN SIREN PRESSURE PULSE GENERATOR FOR MWD AND FLOW MEASUREMENT SYSTEMS

BACKGROUND OF THE INVENTION

1. Field of the Invention

The present invention relates to pressure pulse generators in general. In particular, the invention to pressure pulse generators such as the "mud siren" or "fluid siren" type used in oil industry MWD (Measurements-While-Drilling) operations to transmit downhole measurement information to the well surface during drilling by way of a mud column located in a drill string as well as those used in flow measurement systems.

2. Description of the Related Art

Many systems exist for transmitting data representative of one or more measured downhole conditions to the surface during the drilling of a well borehole. One such system, described in Godbey U.S. Pat. No. 3,309,656, employs a downhole pressure pulse generator or modulator and is operated to transmit modulated signals carrying encoded data at acoustic frequencies to the surface by way of the mud column in the drill string. In such a system, it has been found useful to power the downhole electrical components by means of a self-contained mud-driven turbine generator unit (known as a "mud turbine") positioned downstream of the modulator.

Existing pressure pulse generators of the mud siren type usually take the form of "turbine-like" signal generating valves positioned in the drill string near the drill bit and exposed to the circulating mud path. A typical modulator includes a fixed stator and a motor-driven rotatable rotor, positioned coaxially of each other. The stator and rotor are each formed with a plurality of block-like radial extensions or lobes spaced circumferentially about a central hub so that the gaps between adjacent lobes present a plurality of openings or ports to the oncoming mud flow stream. When the respective ports of the stator and rotor are directly aligned, they provide the greatest passageway for flow of drilling mud through the siren. When the rotor rotates relative to the stator, alignment between the respective ports shifts, interrupting the flow of mud to generate pressure pulses in the nature of acoustic signals. Rotation of the rotor relative to the stator in the circulating mud flow produces a cyclic acoustic signal that travels up the mud column in the drill string and is detected at the drill site surface. By selectively varying the rotation of the rotor to produce changes in the signal, modulation in the form of an encoded pressure pulse is achieved which carries information from downhole instruments to the surface for analysis.

Recently, fluid sirens have been developed in which the rotor is driven by fluid flow rather than by a motor. These fluid sirens are useful for transmitting data relating to fluid flow rates and fluid densities. An example of such a siren is described in greater detail in commonly assigned U.S. patent application Ser. No. 08/404,232, which is co-pending.

The lobe configuration and the relative placement of the stator and rotor elements of fluid sirens of this nature subject the rotor to fluid dynamic forces from the fluid stream that cause the rotor to seek a "stable closed" position in which the lobes of the rotor block the ports of the stator. There is, thus, an undesirable tendency for the modulator to assume a position that blocks the free flow of fluid. This increases the likelihood that the siren will jam, as solids carried by the mud or other fluid stream are forced to pass through restricted siren passages. In commercial MWD operations, however, the spacing between the rotor and stator components of the siren must be narrow in order to produce satisfactory acoustic signals. This requirement makes the siren particularly susceptible to jamming or obstruction by solids present in the fluid stream.

The jamming problem often occurs when the rate of fluid flow is low. If the flow rate is low, the rotor may turn slowly, or not at all, raising the specter that particles will become lodged in the siren. Jamming also occurs when the fluid flow rate is very high and turbulent, causing the siren to lock up. Prolonged siren closure can obstruct mud flow to such an extent that lubrication of the drill bit and other vital functions of the mud become so adversely affected that the entire drilling operation is jeopardized.

A number of approaches have been proposed to solve the problem caused by the tendency of sirens to assume the closed position described above. One such approach, described in Patton, et al., U.S. Pat. No. 3,792,429, is to use magnetic force to bias the siren toward an open position and hold it there in the event the rotor becomes inoperative. Magnetic attraction between a magnet attached to the siren housing and a cooperating magnetic element positioned on the rotor shaft develops sufficient torque to overcome the fluid dynamic torque caused by the drilling mud stream. This approach has the disadvantage that introduction of an extraneous magnetic field downhole can interfere with measurements of the earth's magnetic field (used to derive tool orientation). It also requires more power from the drive motor to overcome the effects of magnetic forces tending to resist rotation.

Unfortunately, none of the methods or devices developed to date has been entirely successful in eliminating the problem of siren rotor lock-up or stalling, particularly when the flow rate through the siren is very high or very low. The maximum or minimum flow rate at which the rotor will either lock-up or stall is a function of the specific siren design, and is related to the pipe diameter, fluid viscosity, efficiency of the driving turbine and the inherent friction of the siren unit.

A related problem exists with fluid powered sirens used as flowmeters when subjected to excessively high flow rates. With existing siren designs, a high flow rate causes the rotor to spin faster than desired. High frequency signals have lower amplitudes. Also, signals with very high frequencies tend to attenuate rapidly over distances. Therefore, signals with high frequencies often are undetectable by surface detection equipment. It has been shown that the amplitude of a pulsed pressure signal decreases as the pulse frequency increases. Generally, a pressure pulse produced in a long pipe will lose up to 50 percent of its amplitude when the frequency is increased from 1 Hz to 10 Hz and will lose up to 75 percent at 30 Hz. Also, there are other factors that affect pulse amplitude, such as the pipe diameter, pipe length and kinematic viscosity of the fluid.

SUMMARY OF THE INVENTION

The present invention provides an improved siren assembly of the type used for communicating information between points of a wellbore or flowbore through which fluid is flowed. The improved siren assembly is suitable for use in numerous applications in which siren designs are employed. Specific applications include MWD systems as well as flow measurement systems in which these types of pressure pulse generators are utilized as flowmeters. Flow measurement systems are employed, for example, in conventional petroleum production arrangements as well as in artificial lift systems. In exemplary conventional production arrangements, flowmeters are incorporated in the production tubing flowbore to measure the flowrate therethrough. In exemplary artificial lift systems, flowmeters are incorporated into the flowpaths of each of several artificial lift valves to measure the rates of transmission of lift gas fluid into the flowbore from the surrounding annulus. In MWD systems, the siren is employed as the modulator assembly for a data signalling unit within a downhole MWD tool.

In one aspect, the arrangement of the present invention provides a system for causing greater responsiveness of the fluid siren's rotatable rotor to a given flow rate. The siren assembly also is more efficient than previous designs. It is capable of extracting a greater amount of power from the fluid flow and transmitting it to the siren rotor to produce strong pressure pulse signals. Thus, the arrangement is suitable for applications wherein fluid flow rate is very low, or very high.

A turbine rotor is coaxially positioned between the non-rotating turbine deflector and the siren rotor. The turbine rotor includes a set of fins radially extending about its circumference. In cross-section, the fins are canted or curved in an opposite direction from the direction of fluid deflection caused by the fins of the turbine deflector. Fluid passing through the siren will, therefore, impart greater torque to the siren rotor than it would with conventional designs that do not incorporate a turbine rotor. Fluid flow drives the turbine rotor and siren rotor combination more efficiently than driving a siren rotor directly.

In another aspect, the present invention controls the rotational speed of the siren rotor in instances where the fluid flow rate is excessive. Control is affected by use of an epicyclical gear reducer assembly which operably associates the turbine rotor and the siren rotor. In the specific exemplary construction described, the gear reducer features a toothed central drive gear affixed to a central shaft extending from the turbine rotor for rotation therewith. The siren rotor presents an inwardly-toothed gear ring. At least one planetary gear operationally associates the drive gear with the gear ring through the use of teeth which are complimentarily sized and shaped to those of the gear ring and drive gear. The gear ring then is rotated by the drive gear through the planetary gears during operation. The ratio or number of gear ring teeth to the number of drive gear teeth governs the rate at which the siren rotor turns in relation to the rotation rate of the turbine rotor. The gear reducer may be of any particular alternative design such as a harmonic gear reducer.

BRIEF DESCRIPTION OF THE DRAWINGS

The construction, operation, and advantages of the invention can be better understood by referring to the drawings forming a part of the specification, in which.

During the course of the following description, the terms "upstream" and "downstream" are used to denote the relative position of certain components with respect to the direction of flow of fluid within the production string or drillpipe. Thus, where a component is described as upstream from another, it is intended to mean that fluid flows first through that component before flowing through a second component. Similarly, the terms such as "above," "upper," and "below" are used to identify the relative position of components in the borehole, with respect to the distance to the surface of the well, measured along the borehole path.

DETAILED DESCRIPTION OF THE PREFERRED EMBODIMENTS

The invention will be described specifically in relation to two specific embodiments. The first embodiment, a conventional petrochemical production arrangement, is representative of use of the siren in flow measurement applications wherein information regarding flow through or past a specific point is of interest. The second embodiment illustrates use of the siren in relation to an exemplary MWD system.

Figure 1:
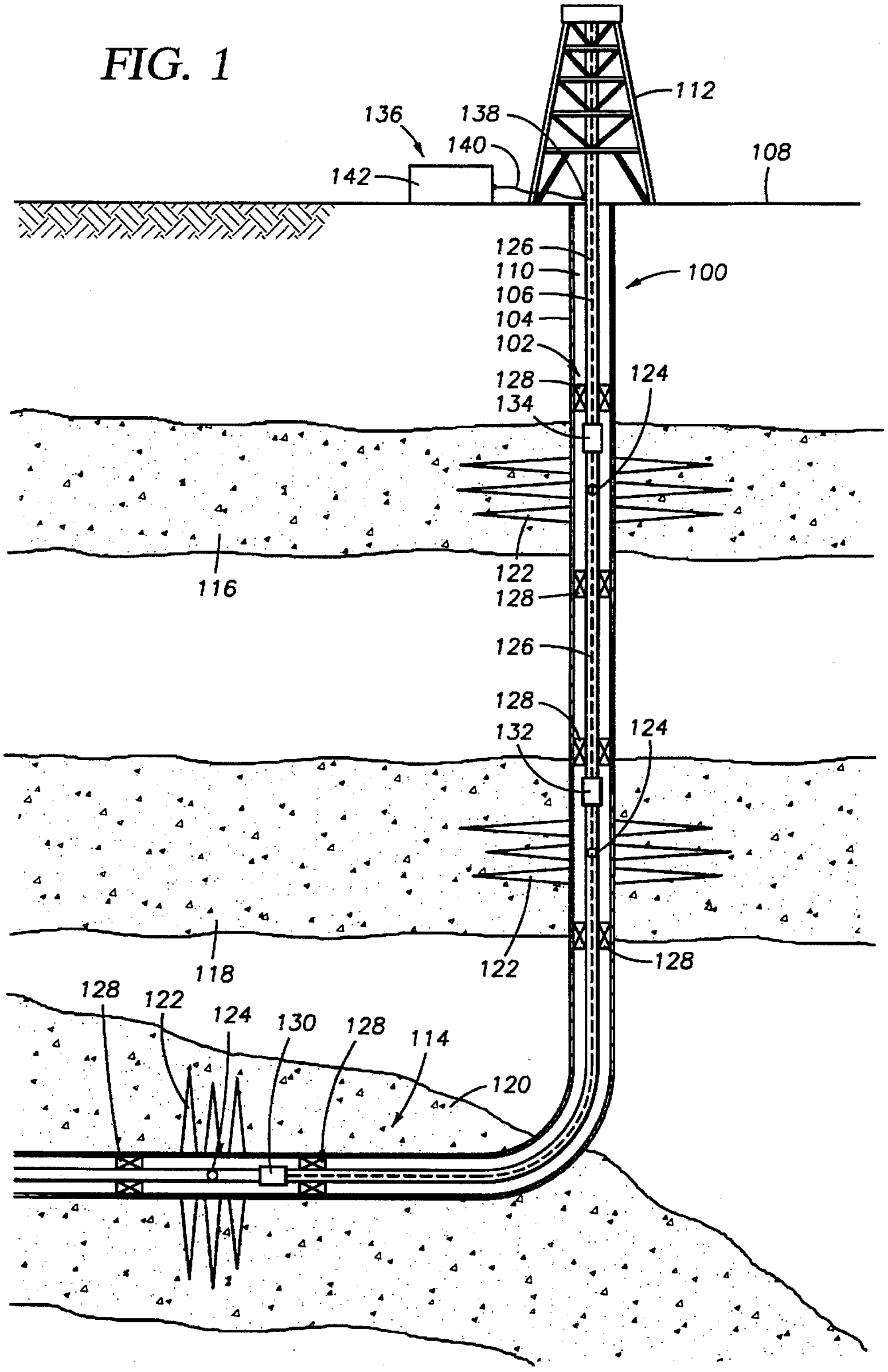
FIG. 1 illustrates an exemplary production arrangement wherein a siren of the type described herein might be employed as a flowmeter.

Referring now to FIG. 1, an exemplary petrochemical production arrangement 100 with a subterranean wellbore 102 having an outer casing 104. According to normal convention, tubular production string 106 extends from the surface 108 within the casing 104, defining an annulus 110 between the production string 106 and casing 104. The production string 106 is operably connected to a production wellhead 112 at the surface 108. In accordance with an exemplary embodiment of the present invention, a portion of the wellbore 102 is deviated (as indicated generally at 114).

The wellbore 102 passes through a number of potential producing zones 116, 118 and 120 wherein the casing 104 has been perforated previously by a perforating gun or other suitable perforating device. These perforations are shown schematically at 122. Production nipples 124 within the production string 106 are located proximate each potential producing zone to receive petrochemical fluids from the zones and transmit them into the interior of the production string 106. As a consequence, a fluid column 126 is formed within the production string 106 which extends to the production wellhead 112 above. The fluid column 126 may be thought of as flowing from the production zones 116, 118, 120 at the upstream end to the production wellhead 112 at the downstream end. A number of packers 128 are placed within the annulus 110 above and below each of the production nipples. It is to be understood that FIG. 1 presents a deviated well bore with multiple completion zones for illustrative purposes only. The subject matter of the present invention is suitable for application to vertical wells, as well as wells having single completions. Additionally, the location of production arrangement (subterranean vs. subsea) is not a critical factor to implementation of the present invention.

Along the production string 106, a number of fluid siren flowmeters 130, 132, 134 are positioned proximate to and slightly downstream of a corresponding nipple 124. A signal detection assembly 136 preferably is located proximate the production well head 112. The signal detection assembly includes at least one transducer 138 or other detector, which is operably affixed within the production string 106 at or near the surface 108. When installed, the transducer 138 must be in contact with the fluid column 126 within the production string 106. It is preferred that more than one transducer 138 be used and that the transducers 138 be located at different locations along the production string. This redundant arrangement decreases the likelihood that the transducer will be located at or near a "node" of the production string wherein the signal is incapable of being picked up or detected by the transducer. A wire or other transmission medium, shown schematically at 140, is used to transmit signals received by the transducer to storage device 142. It is to be understood that the transmission medium 140 may include radio, microwave or other electromagnetic carrier wherein the signal will be sent to the storage device 142, even when the storage device 142 is located remotely.

The storage device 142 may include a spectrum analyzer such as the Hi Techniques Model IQ300 Spectrum Analyzer. Alternatively, the storage device 142 may comprise a suitably configured computer such as a personal computer having a data acquisition card, such as the D.A.S.H. 16 sold by Omega Technologies Company at One Omega Drive, P.O. Box 4047, Stamford, Conn. 06907-0047. The computer may also include suitable spectrum analysis software such as Labtech Notebook available from Laboratory Technologies Corporation at 400 Research Drive, Wilmington, Md. 01887.

Fluid sirens or modulators of the types described herein are also useful in numerous other well-related applications where fluid flow is occurring. These applications include, for example, the enhanced recovery phase of the petroleum production process wherein artificial lift valves are employed to selectively transmit pumped in lift gas into the production string from the well annulus. It is to be understood that the siren pressure pulse generator arrangement described and claimed herein is suitable for use with fluid sirens or modulators in all such applications.

Figure 2:
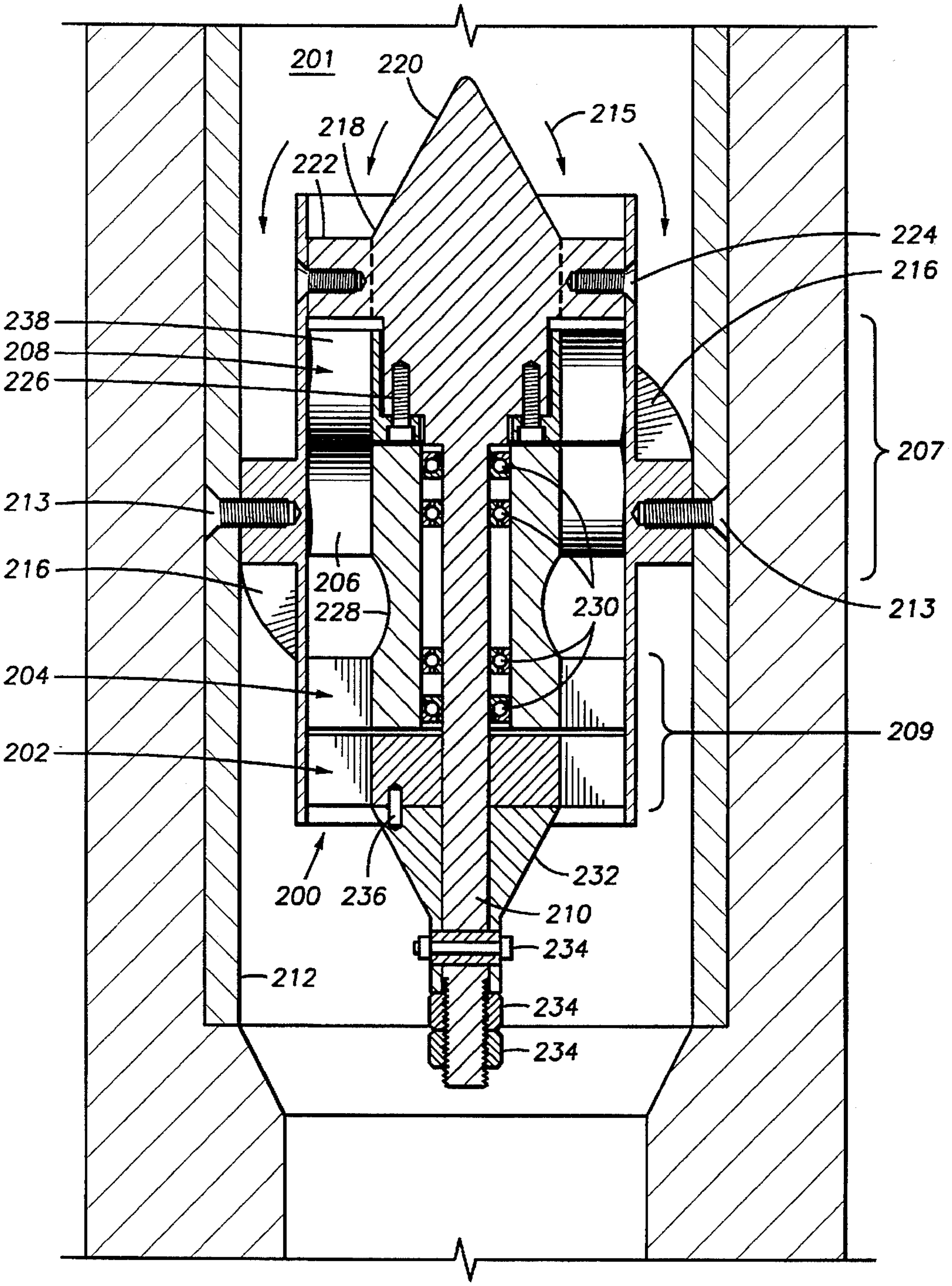
FIG. 2 is a cross-sectional view of an exemplary siren of the present invention configured for use in situations wherein the siren will encounter low to moderate fluid flow rates.
Figure 3:
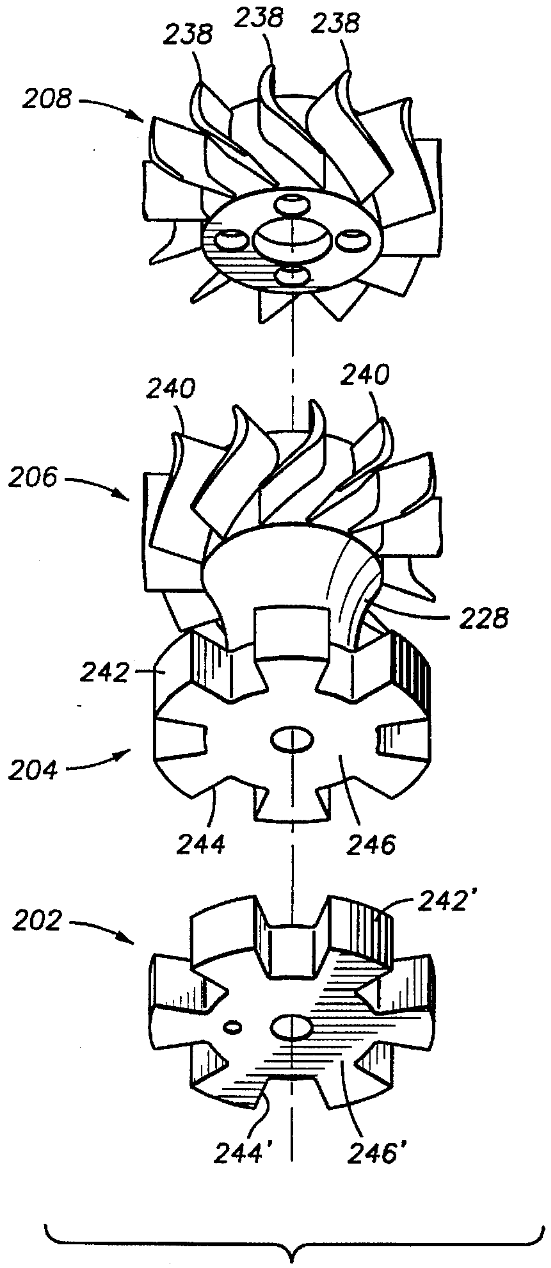
FIG. 3 is an exploded perspective view of the siren illustrated in FIG. 2.

Referring now to FIGS. 2 and 3, a siren assembly 200 is shown which is configured to drive the siren rotor during low to moderate flow rates. The siren assembly 200 is located within flowbore 201 and preferably comprises a fixed siren stator 202, a rotatable siren rotor 204, a rotatable turbine rotor 206 and a fixed turbine deflector 208 mounted on a central shaft 210 within a generally cylindrical siren housing 212. When assembled, the siren assembly 200 may also be described as containing a turbine section 207 which is made up of the turbine rotor 206 and the turbine deflector 208. The siren assembly 200 also includes a siren section 209 which is made up of the siren rotor 204 and the stator 202.

In accordance with the preferred embodiment, a generally cylindrical diverter or bypass unit 214 mounts to the interior surface of the siren housing 212, with the turbine deflector 208, turbine rotor 206, siren rotor 204 and siren stator 202 all preferably mounted within the interior of the diverter unit 214. Accordingly, fluid flows into the housing 212 as shown by arrows 215, and is diverted to flow both inside and outside the diverter unit 214. The amount of bypass will depend upon the fluid flow rate and may be zero for very low flow rates. The flow of fluid inside the diverter unit 214 then is deflected by the turbine deflector 208, and in a manner to be described, causes the turbine rotor 206 to rotate which drives the siren rotor 204 relative to the siren stator 202, producing a cyclical pressure pulse in the column of fluid that can be detected at the surface, such as by a signal detection assembly 136 (shown in FIG. 1), according to conventional techniques. It should be noted that the siren rotor 204 could be located either above or below the siren stator 202.

The diverter or bypass unit 214 preferably has a generally cylindrical configuration and is maintained in position within the housing 212 by a plurality of set screws or lock screws 213 that extend through the housing 212 and into the diverter unit 214. The screws 213 preferably are equidistantly spaced around the circumference of the housing 212. The diverter unit 214 preferably includes a plurality of spiralling ribs 216 on the exterior surface of the diverter unit 214, causing the drilling mud to flow more slowly past the exterior surface of the diverter unit 214, creating a high pressure on the exterior side of the diverter that forces drilling mud to flow into the interior of the diverter unit 214 and thus through the turbine deflector 208, turbine rotor 206, siren rotor 104 and siren stator 202.

As FIG. 2 illustrates, the siren stator 202, siren rotor 204, turbine rotor 206 and turbine deflector 208 are all mounted within the interior of the diverter unit 214 on central shaft 210 in a coaxial manner. Additionally, a nose section 218 is affixed within the upper portion of the diverter unit 214 presenting a conically-shaped central portion 220 to assist in diversion of fluid flow into the diverter unit 214. A number of radial arms 222 project outwardly from the central portion 220 so that the nose section 218 may be affixed within the diverter unit 214 by means of set screws 224. The turbine deflector 208 is secured against rotation by attachment to the central portion 220 of the nose section 218 using screws 226.

The turbine rotor 206 and siren rotor 204 are operably interconnected by means of spindle 228 so that both rotors 204 and 206 will rotate together. The spindle 228 is mounted upon the central shaft 210 to freely rotate thereabout. A number of bushings 230 are located on the inside of the spindle 228 to aid in rotation of the spindle 228 about the shaft 210.

An end cap 232 is secured at the lower end of the shaft 210 by screws and nuts 234 to hold the above-described components in place on the shaft 210. Additionally, a pin 236 passes partially through the end cap 232 and the siren stator 202 to secure the stator 202 against rotation.

As shown particularly in FIG. 3, the turbine deflector 208 presents radially extending fins 238 about its circumference. The fins 238 are considered directional in that they change the direction or orientation of fluid flow passing through the diverter unit 214 to induce a rotational component to the flow about the deflector 208.

The turbine rotor 206 also presents a set of radially protruding fins 240 which are curved or canted in a direction generally opposite from the direction of the fins 238 of the turbine deflector 208. The curved fins 240 are particularly shaped to receive and capture rotationally diverted fluid from the diverter 208 and use it to efficiently rotate the turbine rotor 206 about the central shaft 210. An exemplary shape for the fins is illustrated in FIG. 3. The shape of the fins in the flow deflector and turbine rotor are to be fashioned after those used in water powered turbine generators, a well known technology.

Figure 3A:
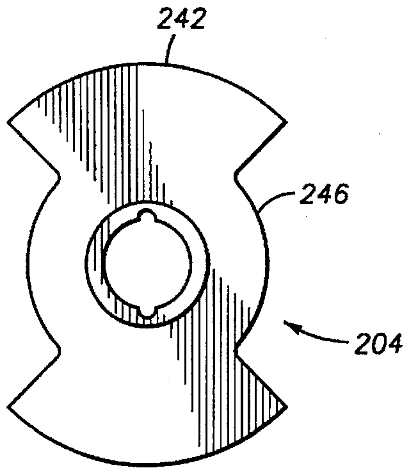
FIGS. 3A–3B present alternative geometrical constructions for a siren rotor for use within the present invention.
Figure 3B:
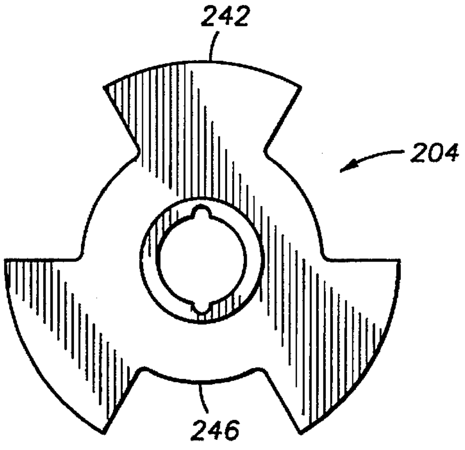

The siren rotor 204 and siren stator 202 each include at least one lobe 242 (identified as 242' in the stator) and at least one port 244 (identified as 244' in the stator) around a central hub section 246 (246' in the stator). Preferably, the siren stator and siren rotor have generally the same configuration and dimensions. In addition, in a preferred embodiment, and as shown for example in FIG. 3, the lobes and ports of the rotor and stator are configured to have substantially the same surface area with respect to the mud stream. Thus, as seen in FIG. 3 for a six lobe configuration, both the lobes and ports each extend along an arc of 30 degrees from the central hub section 246. FIGS. 3A–3B illustrate alternative end-on views of a siren rotor 204 with two lobes 242 and three lobes, respectively, extending from a central hub section 246. Preferred dimensions of the rotors shown in FIGS. 3 (six lobes), 3A (two lobes) and 3B (three lobes) are as follows:

TABLE I

| (PREFERRED DIMENSIONS) |
|---|
| ROTOR WITH 6 LOBES |
| Diameter of hub section = 1.72" |
| Inner diameter = 0.6257" |
| Angular width of lobes = 30° |
| Angular width of ports = 30° |
| Depth of lobes = 0.541" |
| ROTOR WITH 2 LOBES |
| Diameter of hub section = 1.72" |
| Inner diameter = 0.6257" |
| Angular width of lobes = 90° |
| Angular width of ports = 90° |
| Depth of lobes = 0.541" |
| ROTOR WITH 3 LOBES |
| Diameter of hub section = 1.72" |
| Inner diameter = 0.6257" |
| Angular width of lobes = 60° |
| Angular width of ports = 60° |
| Depth of lobes = 0.541" |

These dimensions are only meant to be illustrative of the preferred embodiment and should not be construed as a limitation on the number and dimensions of the rotor and stator configurations. One skilled in the art will understand that other configurations may be used without departing from the principles of the present invention. These geometrical design parameters may likewise be applied to the siren stator 202. The number of lobes on the siren rotor 204 and siren stator 202 define the number of pulses that will be generated during one revolution of the siren rotor 204.

Due to the reversed direction of the fins 240 of the turbine rotor 206, the fluid is captured and channeled downwardly as it flows through the diverter unit 214. The capturing and channeling action of the fins 240 causes an increased amount of torque to be applied to the turbine rotor 206 and rotationally affixed siren rotor 204. As a result, fluid flow drives the rotor 204 more efficiently.

Figure 4:
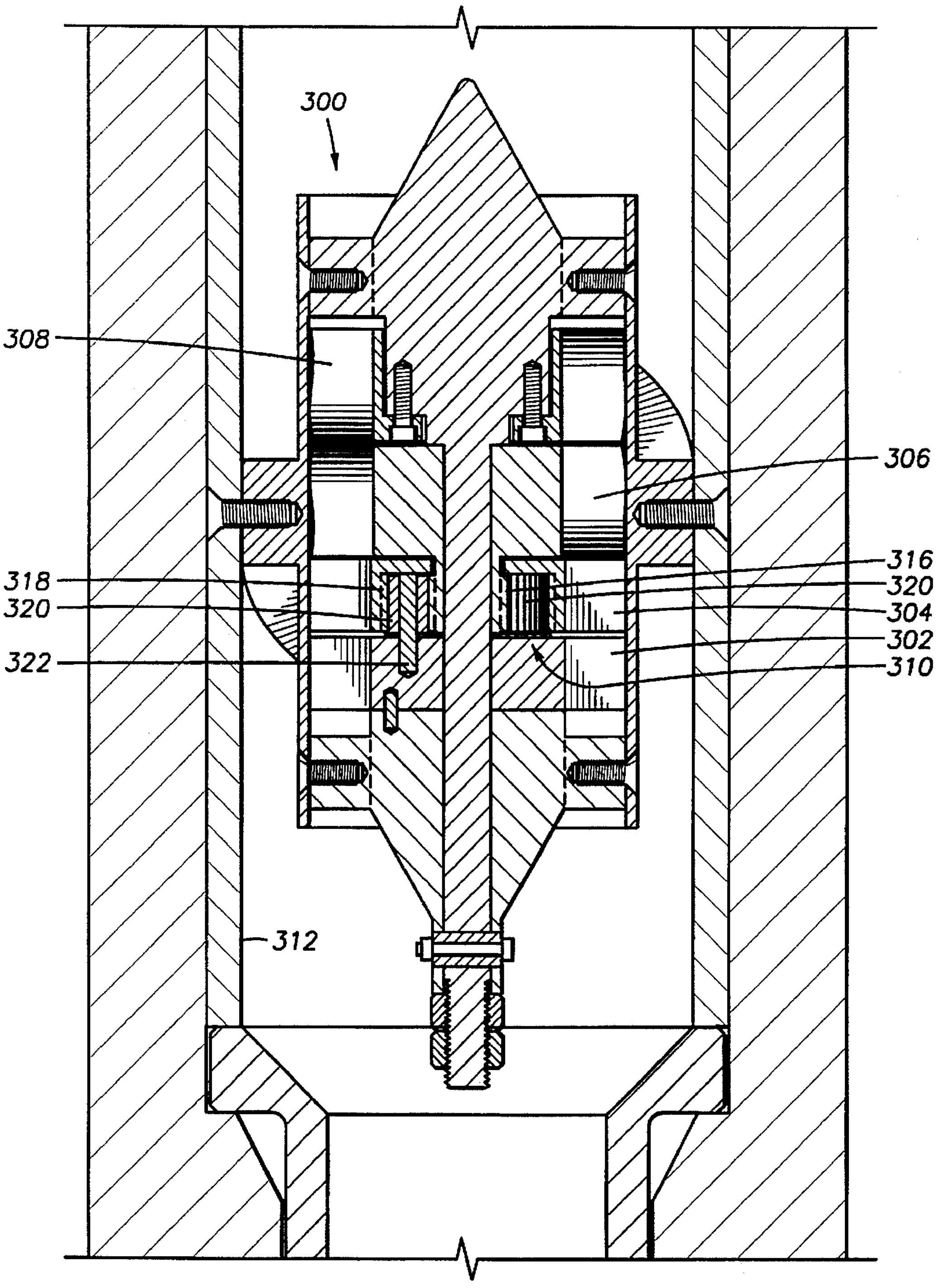
FIG. 4 is a cross-sectional view of an exemplary siren in accordance with the present invention which is configured with a gear reducer for situations in which the siren is expected to encounter relatively high flow rates.
Figure 5:
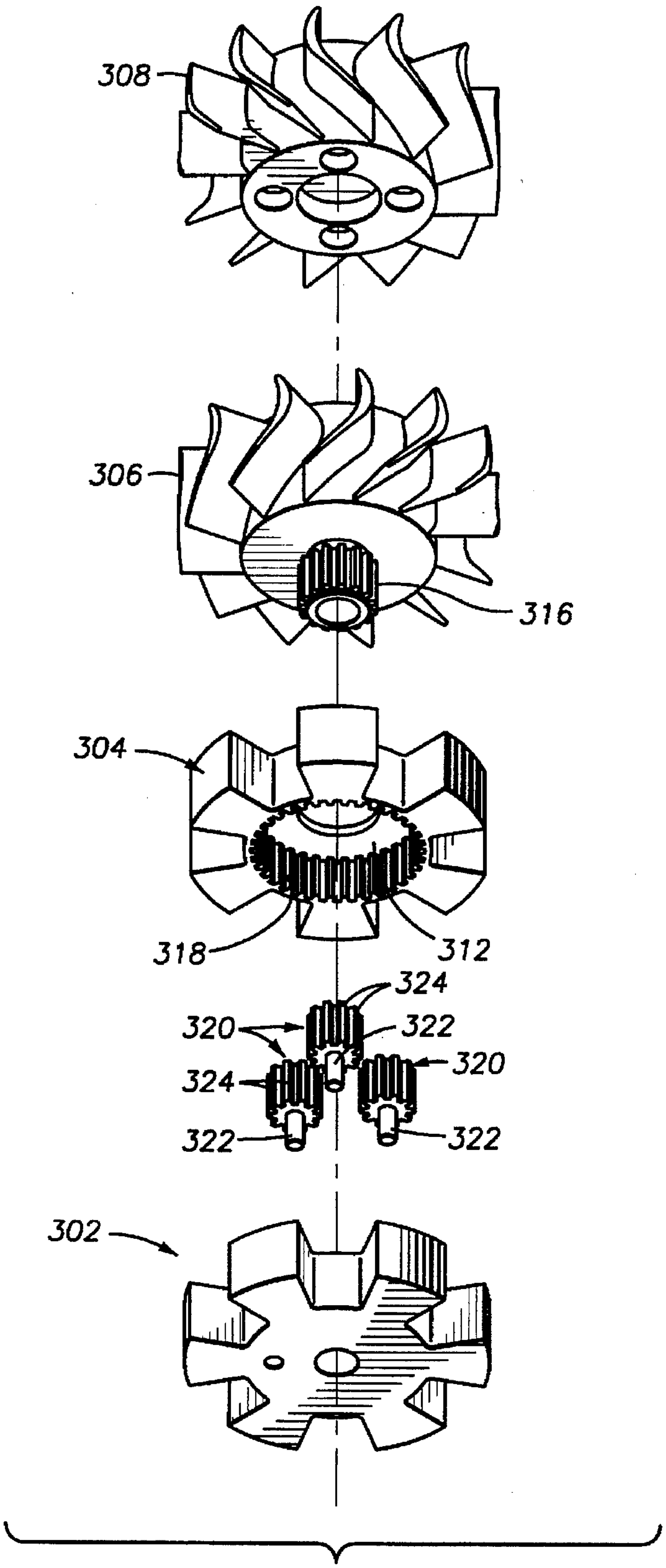
FIG. 5 is an exploded perspective view of the siren illustrated in FIG. 4.

FIGS. 4 and 5 illustrate a second preferred embodiment wherein a siren 300 is configured for excessively high flow rates. The siren 300 is constructed to have many of the same components as the siren 200. It therefore includes a fixed siren stator 302, rotatable siren rotor 304, a rotatable turbine rotor 306 and a fixed turbine deflector 308. The siren 300 also includes a gear reducer assembly, indicated generally at 310, positioned between the turbine rotor 306 and the siren rotor 304.

The planetary gear reducer assembly 310 may be seen in greater detail by the exploded view in FIG. 5. As shown, the planetary gear reducer assembly 310 includes an apertured cylindrical mounting 312 within the siren rotor 304 which presents a lower axial surface 314. A toothed central drive gear 316 extends downwardly from the turbine rotor 306 and through the apertured mounting 312 of the rotor 304. An inwardly-directed toothed gear ring 318 surrounds the radial circumference of the mounting 312.

Three toothed planetary gears 320 with centrally-located downwardly protruding shafts 322 are rotationally mounted in the body of the siren stator 302. Circumferential teeth 324 on the planetary gears 320 are shaped and sized to engage and to be generally complimentary to the teeth of the gear ring 318 and of the central drive gear 316. The number of teeth on the gear ring 318 is preferably greater than the number of teeth presented by the drive gear 316. Assuming the number of teeth on the gear ring 318 is twice that of teeth on the drive gear 316, for each two revolutions of the turbine rotor 306 and drive gear 316, the planetary gears 320 will rotate the siren rotor 304 one time in the opposite direction from the turbine rotor 306. Rotation of the siren rotor 304 is, therefore, slowed by a factor of 2:1 in relation to rotation of the drive gear 316 of the turbine rotor 306. The ratio of the number of teeth on the gear ring 318 to the number of teeth on the drive gear 316 may be varied to achieve a desired degree of speed decrease (i.e., 3:1, 4:1, 10:1, etc. . . . ). Using a 10:1 tooth ratio, for example, a 500 Hz signal may be reduced to produce a 50 Hz signal.

It should be understood that a number of specific constructions for gear reducer assemblies are known, and that the invention is not intended to be limited to particular constructions. The gear reducer does not necessarily have to be an epicyclical, planetary gear reducer, but could be any type which is suitably sized and shaped to be disposed between the turbine rotor 306 and siren rotor 304. One example is a harmonic gear reducer of a type which is known in the art.

It is noted that the inclusion of a gear reducer will increase the amount of torque transmitted to the siren rotor as well as reducing the frequency of pulses of the siren. For example, if the torque produced by the turbine rotor was 10 in-lbs, and the ratio of the gear reducer used is 10/1, the torque ultimately transmitted to the siren rotor would be increased from 10 to 100 in-lbs. Likewise, if the rotation speed of the turbine rotor was 100 rpm, and the ratio of the gear reducer was 10/1, the speed of the siren rotor would be decreased from 100 to 10 rpm.

It is further noted that a gear arrangement might be employed which would cause the rate of rotation of the siren rotor to be greater than that of the turbine rotor. This might be done in an instance where it is desirable to cause the resultant signal to have a higher frequency than it would if driven directly.

Figure 6:
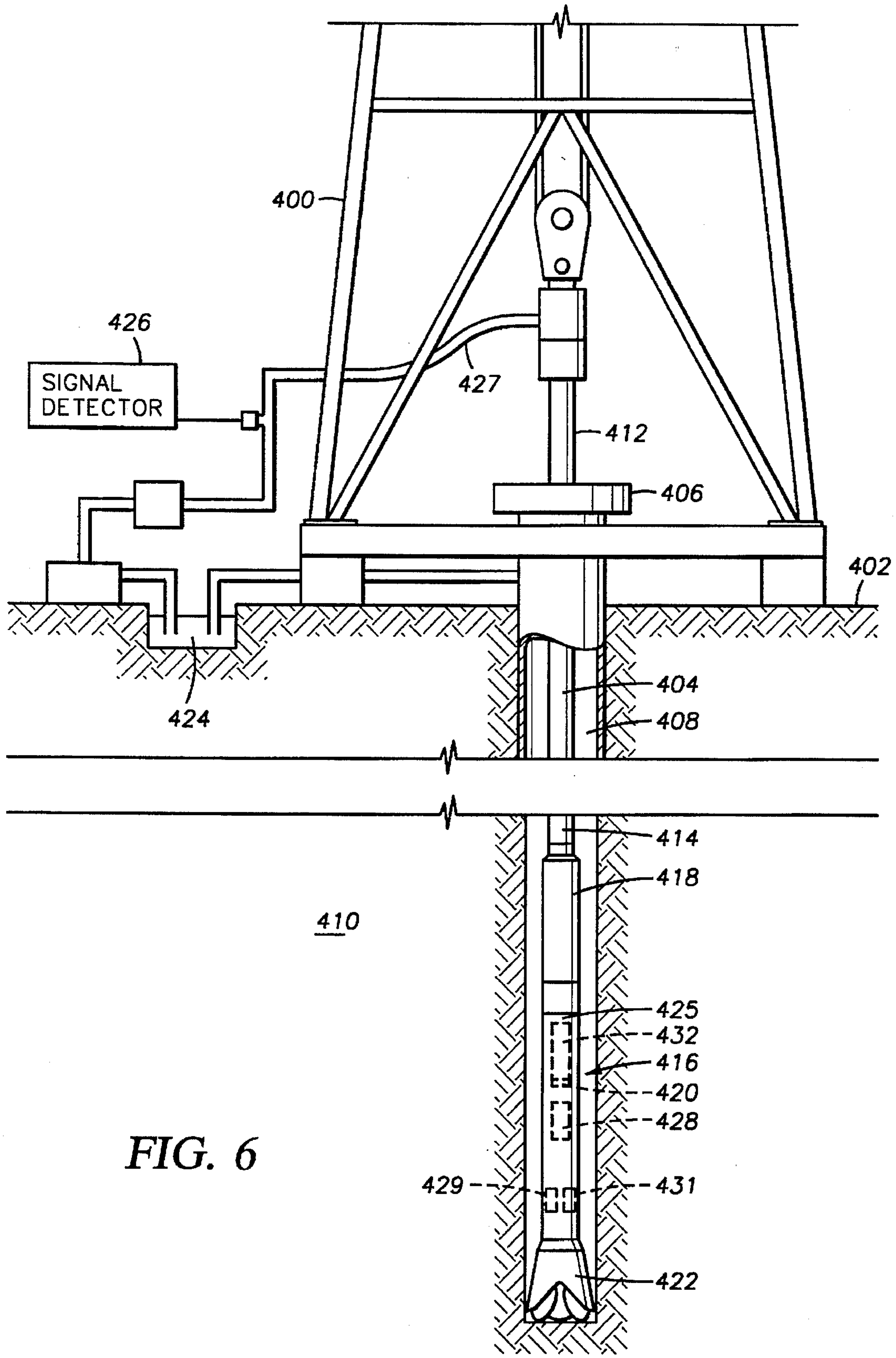
FIG. 6 illustrates an exemplary MWD arrangement into which the siren may be incorporated.

Referring now to FIG. 6, an exemplary arrangement is shown with a siren employed in a typical MWD application. A drilling installation is illustrated which includes a drilling rig 400, constructed at the surface 402 of the well, supporting a drill string 404. The drill string 404 penetrates through a rotary table 406 and into a borehole 408 that is being drilled through earth formations 410. The drill string 404 includes a kelly 412 at its upper end, drill pipe 414 coupled to the kelly 412, and a bottom hole assembly 416 (commonly referred to as a "BHA") coupled to the lower end of the drill pipe 414. The BHA 416 typically includes drill collars 418, an MWD tool 420, and a drill bit 422 for penetrating through earth formations to create the borehole 408. In operation, the kelly 412, the drill pipe 414 and the BHA 416 are rotated by the rotary table 406. Alternatively, or in addition to the rotation of the drill pipe 414 by the rotary table 406, the BHA 416 may also be rotated, as will be understood by one skilled in the art, by a downhole motor. The drill collars are used, in accordance with conventional techniques, to add weight to the drill bit 422 and to stiffen the BHA 416, thereby enabling the BHA 416 to transmit weight to the drill bit 422 without buckling. The weight applied through the drill collars to the bit 422 permits the drill bit to crush and make cuttings in the underground formations.

As shown schematically in FIG. 6, the BHA 416 includes an MWD tool 420, which may be considered part of the drill collar section 418. As the drill bit 422 operates, substantial quantities of drilling fluid (commonly referred to as "drilling mud") are pumped from a mud pit 424 at the surface through the kelly hose 427, into the drill pipe, to the drill bit 422. The drilling mud is discharged from the drill bit 422 and functions to cool and lubricate the drill bit, and to carry away earth cuttings made by the bit. After flowing through the drill bit 422, the drilling fluid rises back to the surface through the annular area between the drill pipe 414 and the borehole 408, where it is collected and returned to the mud pit 424 for filtering. The circulating column of drilling mud flowing through the drill string also functions as a medium for transmitting pressure pulse acoustic wave signals, carrying information from the MWD tool 420 to the surface.

Typically, a downhole data signalling unit 425 is provided as part of the MWD tool 420 which includes transducers mounted on the tool that take the form of one or more condition responsive sensors 429 and 431, which are coupled to appropriate data encoding circuitry, such as an encoder 428, which sequentially produces encoded digital data electrical signals representative of the measurements obtained by sensors 429 and 431. While two sensors are shown, one skilled in the art will understand that a smaller or larger number of sensors may be used without departing from the principles of the present invention. The sensors are selected and adapted as required for the particular drilling operation, to measure such downhole parameters as the downhole pressure, the temperature, the resistivity or conductivity of the drilling mud or earth formations, and the density and porosity of the earth formations, as well as to measure various other downhole conditions according to known techniques. See generally "State of the Art in MWD," International MWD Society (Jan. 19, 1993).

The MWD tool 420 preferably is located as close to the bit 422 as practical. Signals representing measurements of borehole dimensions and drilling parameters are generated and stored in the MWD tool 420. In addition, some or all of the signals also may be routed through a mud pulse modulator assembly in the drill string 404 to a signal detector/control unit 426 at the earth's surface 402, where the signals are processed and analyzed.

In accordance with the preferred embodiment of this invention, the data signalling unit 425 preferably includes a siren assembly to selectively interrupt or obstruct the flow of drilling mud through the drill string 404, to thereby produce digitally encoded pressure pulses in the form of acoustic wave signals. The siren assembly 432 preferably mounts within the MWD drill collar 420 of the BHA according to conventional techniques. The siren assembly 432 is selectively operated in response to the data encoded electrical output of the encoder 428 to generate a corresponding encoded acoustic wave signal. This acoustic signal is transmitted to the well surface through the medium of the drilling mud flowing in the drill string, as a series of pressure pulse signals, which preferably are encoded binary representations of measurement data indicative of the downhole drilling parameters and formation characteristics measured by sensors 429 and 431. These binary representations preferably are made through the use of modulation techniques on a carrier acoustic wave, including amplitude, frequency or phase-shift modulation. The presence or absence of modulation in a particular interval or transmission bit preferably is used to indicate a binary "0" or a binary "1" in accordance with conventional techniques. When these pressure pulse signals are received at the surface, they are detected, decoded and converted into meaningful data by a conventional acoustic signal detector.

Figure 7:
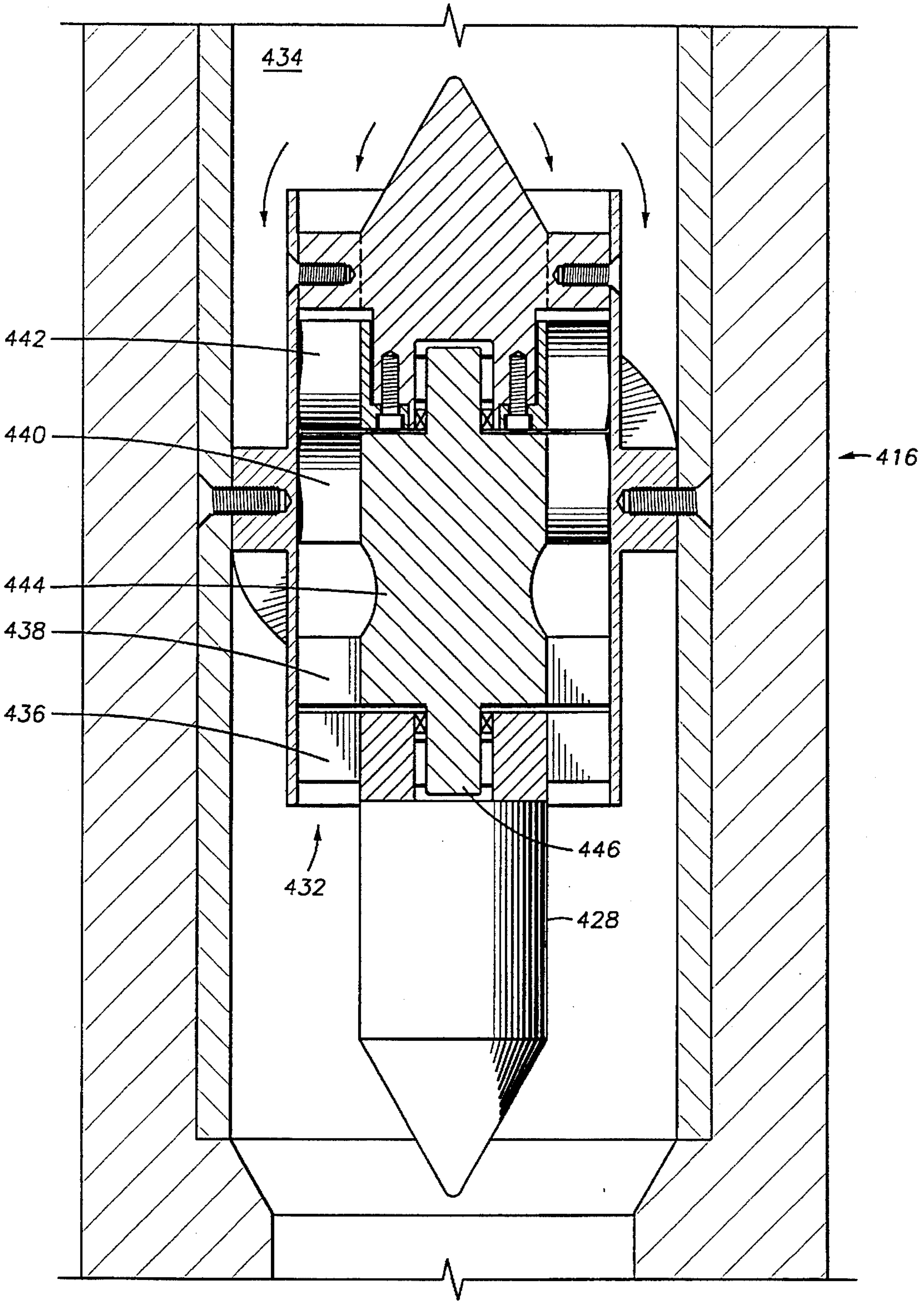
FIG. 7 shows an alternative arrangement for a siren of the type shown in FIGS. 4 and 5 for an MWD system.

An exemplary physical arrangement for portions of the MWD tool 420, as constructed for low flow rates, is shown in partial cross-section in FIG. 7.

The siren assembly 432 is shown disposed within a flowbore portion 434 of the BHA 416 and being powered by the mud flow. Much of the construction of the siren assembly 432 is identical or similar to that of siren assembly 200, described earlier with respect to FIGS. 2 and 3, and will, therefore, not be described in significant detail here. It is noted, however, that the siren assembly 432 includes a siren stator 436, siren rotor 438, turbine rotor 440 and flow deflector 442 as well as a rotatable central spindle 444 which operably interconnects the siren rotor 438 and turbine rotor 440 so that they will rotate together.

The encoder 428 is located below the siren assembly 432 and is operably associated with the spindle 444 by means of a connecting shaft 446 which extends downward through the stator 436 and into the encoder 428. In a manner known in the art, the encoder 428 modulates the siren assembly 432 by selectively increasing, decreasing, stopping or otherwise affecting the rotation of the siren rotor 438. Modulation of this nature is well known in the art. One method of accomplishing it is described in U.S. Pat. No. 3,309,656, issued to Godbey, which is incorporated herein by reference.

It will, therefore, be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such embodiments, adaptations, variations, modifications and equivalent arrangements, the present invention being limited only by the claims appended hereto and the equivalents thereof.

What is claimed is:

1. A fluid powered fluid siren assembly comprising:

a housing which defines a generally cylindrical flowbore therethrough;

a generally cylindrical fluid bypass assembly affixed within the housing flowbore and having an inner cylindrical surface and an outer cylindrical surface, the bypass assembly causing fluid to flow through the flowbore radially within the inner cylindrical surface and radially without the outer cylindrical surface of said bypass assembly;

a stationary turbine flow deflector within the housing which includes one or more directional and radially extending fins for directionally altering fluid flow through the flowbore;

a stationary siren stator secured within said housing, said stator having at least one lobe and at least one port;

a rotatable siren rotor retained coaxially to the stator within said housing, said rotor having at least one lobe and at least one port; and a turbine rotor interconnected with said siren rotor for rotation therewith, the turbine rotor further being associated with the stationary turbine flow deflector for receipt of directionally altered flow from the stationary turbine, the directionally altered flow causing rotation of the turbine rotor with respect to the housing.

2. The fluid powered siren assembly of claim 1 wherein the bypass assembly is affixed to the housing by a radial arm which extends outwardly from the bypass assembly.

3. The fluid powered siren assembly of claim 1 wherein the bypass assembly further comprises a spiraling rib on the exterior surface of the bypass assembly.

4. A fluid powered fluid siren assembly comprising:

a housing defining a generally cylindrical flowbore therethrough;

a stationary turbine flow deflector within the housing which includes one or more directional and radially extending fins for directionally altering fluid flow through the flowbore;

a stationary siren stator secured within said housing, said stator having at least one lobe and at least one port;

a rotatable siren rotor retained coaxially to the stator within said housing, said rotor having at least one lobe and at least one port;

a turbine rotor interconnected with said siren rotor for rotation therewith, the turbine rotor further being associated with the stationary turbine flow deflector for receipt of directionally altered flow from the stationary turbine, the directionally altered flow causing rotation of the turbine rotor with respect to the housing;

an epicyclical gear reducer operably associating the turbine rotor and the siren rotor to affect a change in the rotation rate of the siren rotor with respect to the turbine rotor, the gear reducer comprising:

a toothed drive gear operably affixed to the turbine rotor;

a toothed gear ring operably affixed to the siren rotor; and a toothed planetary gear operably associating the drive gear and the gear ring.

5. The siren assembly of claim 4 wherein the number of teeth on the gear ring is greater than the number of teeth on the drive gear.

6. A fluid powered fluid siren assembly comprising:

a housing defining a generally cylindrical flowbore therethrough;

a stationary turbine flow deflector within the housing which includes one or more directional and radially extending fins for directionally altering fluid flow through the flowbore;

a stationary siren stator secured within said housing, said stator having at least one lobe and at least one port;

a rotatable siren rotor retained coaxially to the stator within said housing, said rotor having at least one lobe and at least one port;

a turbine rotor interconnected with said siren rotor for rotation therewith, the turbine rotor further being associated with the stationary turbine flow deflector for receipt of directionally altered flow from the stationary turbine, the directionally altered flow causing rotation of the turbine rotor with respect to the housing;

an epicyclical gear reducer operably associating the turbine rotor and the siren rotor to affect a change in the rotation rate of the siren rotor with respect to the turbine rotor.

7. The siren assembly of claim 6 wherein the rotation rate of the siren rotor is increased with respect to that of the turbine rotor.

* * * * *